(12) United States Patent
Tourapis et al.

(10) Patent No.: US 12,108,036 B2
(45) Date of Patent: *Oct. 1, 2024

(54) ADAPTIVE BILATERAL FILTERING USING LOOK-UP TABLES

(71) Applicant: Apple Inc., Cupertino, CA (US)

(72) Inventors: Alexandros Tourapis, Los Gatos, CA (US); Krishnakanth Rapaka, San Jose, CA (US); Dominik Mehlem, Rheinbach (DE)

(73) Assignee: Apple Inc., Cupertino, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/901,715

(22) Filed: Sep. 1, 2022

(65) Prior Publication Data

US 2022/0417509 A1 Dec. 29, 2022

Related U.S. Application Data

(63) Continuation of application No. 16/994,506, filed on Aug. 14, 2020, now Pat. No. 11,438,584.

(60) Provisional application No. 62/888,398, filed on Aug. 16, 2019.

(51) Int. Cl.
| | |
|---|---|
| *H04N 19/117* | (2014.01) |
| *H04N 19/126* | (2014.01) |
| *H04N 19/13* | (2014.01) |
| *H04N 19/182* | (2014.01) |
| *H04N 19/82* | (2014.01) |

(52) U.S. Cl.
CPC ......... *H04N 19/117* (2014.11); *H04N 19/126* (2014.11); *H04N 19/182* (2014.11); *H04N 19/13* (2014.11); *H04N 19/82* (2014.11)

(58) Field of Classification Search
None
See application file for complete search history.

(56) References Cited

U.S. PATENT DOCUMENTS

| | | |
|---|---|---|
| 11,438,584 B2 | 9/2022 | Tourapis et al. |
| 2013/0083844 A1 | 4/2013 | Chong et al. |
| 2017/0221183 A1 | 8/2017 | Mody et al. |
| 2018/0220130 A1* | 8/2018 | Zhang ................. H04N 19/86 |
| 2019/0014349 A1 | 1/2019 | Karczewicz et al. |
| 2019/0082176 A1 | 3/2019 | Zhang et al. |
| 2019/0320171 A1 | 10/2019 | Zhang et al. |
| 2020/0128243 A1 | 4/2020 | Wang et al. |
| 2020/0275112 A1 | 8/2020 | Chiang et al. |

(Continued)

FOREIGN PATENT DOCUMENTS

| | | |
|---|---|---|
| CN | 102860005 | 1/2013 |
| CN | 103141100 | 6/2013 |

(Continued)

OTHER PUBLICATIONS

Albrecht et al., "Description of SDR, HDR, and 360° video coding technology proposal by Fraunhofer HHI," JVET of ITU-T SG 16 WP 3 and ISO/IEC JTC 1/SC 29/WG 11, San Diego, Apr. 10-20, 2018, 118 pages.

(Continued)

*Primary Examiner* — Rebecca A Volentine
(74) *Attorney, Agent, or Firm* — Fish & Richardson P.C.

(57) ABSTRACT

A system comprises an encoder configured to compress video data. The encoder includes an adaptive bilateral filter that uses look-up tables. The encoder may encode one or more adaptive adjustment factors to be used by a decoder to select or adjust look-up tables used to decode the compressed video data.

19 Claims, 10 Drawing Sheets

(56) References Cited

U.S. PATENT DOCUMENTS

2021/0051320 A1 2/2021 Tourapis et al.
2021/0211657 A1 7/2021 Ikonin et al.

FOREIGN PATENT DOCUMENTS

| | | |
|---|---|---|
| CN | 104303501 | 1/2015 |
| CN | 106031172 | 10/2016 |
| CN | 107211154 | 9/2017 |
| CN | 109792541 | 5/2019 |
| EP | 3525461 | 8/2019 |
| WO | WO 2010017845 | 2/2010 |
| WO | WO 2018067051 | 4/2018 |
| WO | WO 2018123800 | 7/2018 |
| WO | WO 2018134128 | 7/2018 |
| WO | WO 2020039365 | 2/2020 |

OTHER PUBLICATIONS

International Preliminary Report on Patentability in International Appln. No. PCT/US2020/046533, mailed Mar. 3, 2022, 12 pages.

Naccari et al., "Adaptive Bilateral Filter for Improved In-Loop Filtering in the Emerging High Efficiency Video Coding Standard," 2012 Picture Coding Symposium, May 7-9, 2012, 4 pages.

PCT International Search Report and Written Opinion in International Appln. No. PCT/US2020/046533, mailed Oct. 5, 2020, 19 pages.

Strom et al., "Combined bilateral/SAO loop filter,"JVET-O0548, Joint Video Experts Team (JVET) of ITU-T SG 16 WP 3 and ISO/IEC JTC 1/5C 29/WG 11 15th Meeting: Gothenburg, SE, Jul. 3-12, 2019, 6 pages.

Caihui, "VLSI Design of Inverse Transform Inverse Quantization and Deblocking Filter in the H.264 Decoder," Dissertation for the degree of Master of Engineering, Harbin Institute of Technology, School of Astronautics, Jul. 2012, 63 pages (with English abstract).

Khan et al., "Analysis and Implementation of Block Least Mean Square Adaptive Filter using Offset Binary Coding," 2018 IEEE International Symposium on Circuits and Systems (ISCAS), May 27-30, 2018, Florence, Italy, pp. 1-5.

Lianfang et al., "FIR Digital Filter Design Based on Improved LUT Multiplier," Journal of Zhejiang University (Science Edition), Jun. 1, 2014, 41(6):670-675 (with machine translation).

* cited by examiner

ADAPTIVE BILATERAL FILTERING USING LOOK-UP TABLES

PRIORITY

This application is a continuation of and claims priority to U.S. patent application Ser. No. 16/994,506, filed Aug. 14, 2020, which claims priority to and the benefit of U.S. Provisional Patent Application No. 62/888,398, filed Aug. 16, 2019, the entire contents of each of which are incorporated herein by reference.

TECHNICAL FIELD

This disclosure relates generally to compression and decompression of video data using bilateral filters.

BACKGROUND

Various devices including but not limited to personal computer systems, desktop computer systems, laptop and notebook computers, tablet or pad devices, digital cameras, digital video recorders, and mobile phones or smart phones may include software and/or hardware that my implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods.

In some video processing methods, to perform the processing, each input video frame is divided into rows and columns of blocks of pixels (e.g., 16×16 pixel blocks). Each block of an input video frame may be processed separately, and when done the processed blocks are combined to form the output video frame. This may be referred to as a block processing method.

A block processing method may include multiple processing steps or operations that are applied sequentially to each block in a video frame. To implement such a block processing method, an apparatus or software program such as a video encoder may include or implement a block processing pipeline. A block processing pipeline may include two or more stages, with each stage implementing one or more of the steps or operations of the block processing method.

SUMMARY

In some embodiments, a system includes an encoder configured to compress, for a plurality of images included in plurality of frames of a video, pixel value data for a plurality of pixels of respective ones of the images included in the image frames. The encoder is also configured to apply a bilateral filter as part of a compression process to compress the pixel value data. To apply the bilateral filter, the encoder is configured to, for respective portions of respective images of the video, determine an adaptive adjustment factor to be applied as part of the bilateral filter, wherein the adaptive adjustment factor is determined based on one or more characteristics of the respective portion. To apply the bilateral filter, the encoder is also configured to, for respective pixels of the respective portion for which a bilateral filter offset value is to be determined, select a look-up table from a plurality of look-up tables generated or maintained by the encoder for the bilateral filter, wherein the plurality of look-up tables comprise index values and associated approximated offset values for use in determining the bilateral filter offset value to be applied to the respective pixel.

The encoder is configured to generate or maintain multiple look-up tables wherein different ones of the look-up tables are associated with different quantization parameters used in encoding the respective portions of the respective images of the video.

Also, a given quantization parameter is associated with the respective portion of the respective image frame for which a bilateral filter offset value is being determined for a pixel of the portion and the selected look-up table is selected from a plurality of look-up tables associated with the given quantization parameter based on the determined adaptive adjustment factor. Alternatively, approximated offset values of the selected look-up table are modified based on the determined adaptive adjustment factor. In some embodiments, a particular look-up table may be selected based on the adaptive adjustment factor and approximated offset values of the selected look-up table further adjusted based on the adaptive adjustment factor.

The encoder is also configured to determine, for a first neighboring pixel of the respective pixel, an index value into the selected look-up table, wherein the index value is determined based on a location or a distance of the neighboring pixel relative to the respective pixel and based on a pixel value of the neighboring pixel. The encoder is also configured to determine, for one or more additional neighboring pixels of the respective pixel, respective index values into the selected look-up table or another one or more selected look-up tables, wherein the respective index values are determined based on respective locations or respective distances of the respective neighboring pixels to the respective pixel and based on respective pixel values of the respective neighboring pixels.

Additionally, the encoder is configured to retrieve, for the first neighboring pixel and the one or more additional neighboring pixels, approximated offset values for use in determining the bilateral filter offset value to be applied to the respective pixel, wherein the approximated offset values are retrieved from the selected look-up table or the one or more other look-up tables based on the determined index values. And, the encoder is configured to determine the bilateral filter offset value to be applied to the respective pixel based on the retrieved approximated offset values for the neighboring pixels.

Moreover, the encoder is configured to apply the determined bilateral filter offset value to the pixel value for the respective pixel to determine a filtered pixel value data for the respective pixel.

Figure 1:
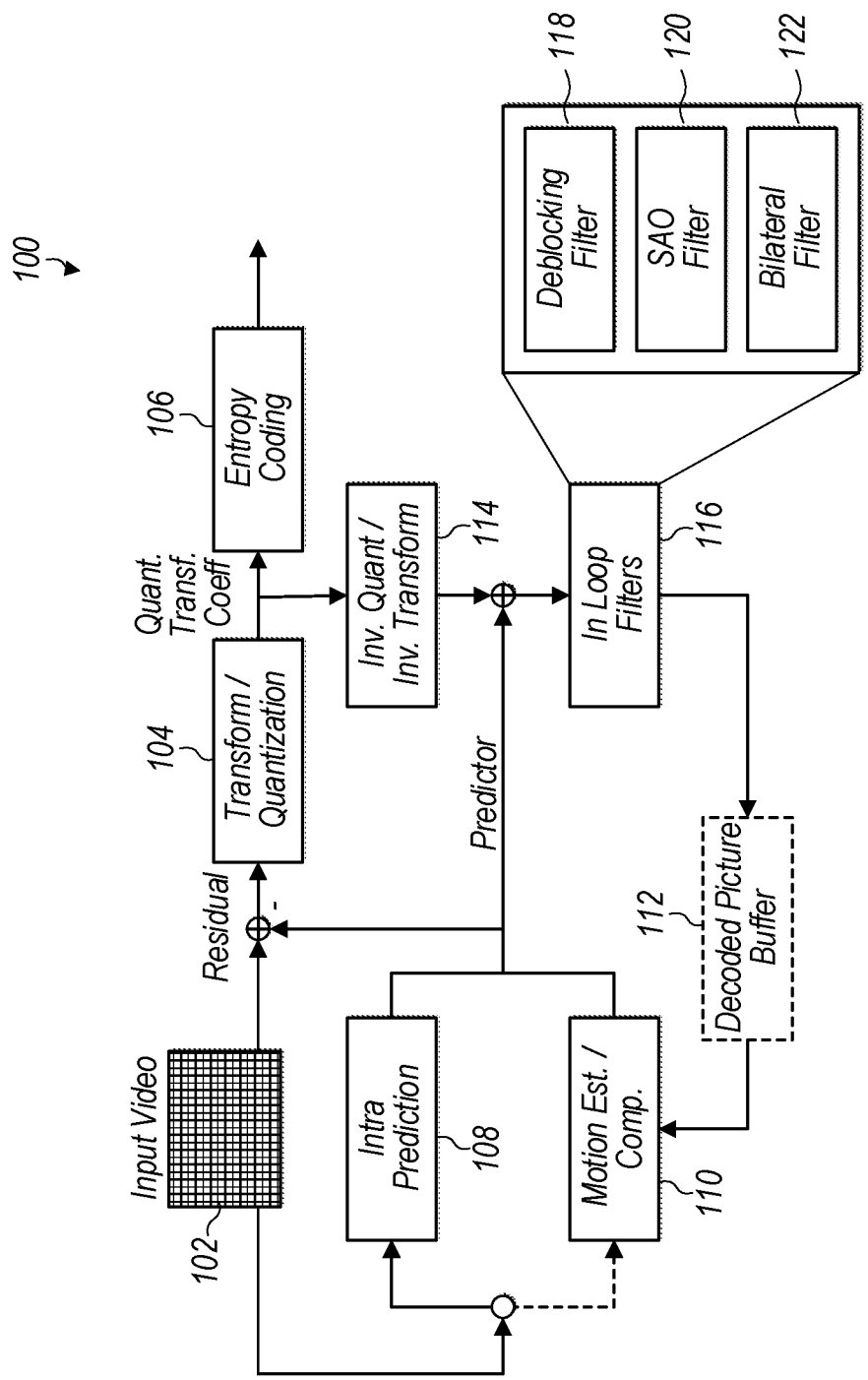
FIG. 1 illustrates an example encoder that may include an adaptive bilateral filter that uses look-up tables, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Bilateral filtering is an advanced filtering method that has been used for a variety of applications, including image de-noising and enhancement. Unlike traditional FIR filters, that utilize fixed coefficients for filtering, bilateral filters consider the similarity between the current sample/central pixel and the pixels in its neighborhood and accordingly adjust the filtering coefficients. This results in better preservation of edges and improved overall subjective quality.

In some embodiments, bilateral filtering may be used as an in-loop filter within a video codec. For example, FIG. 1 illustrates encoder 100 that receives input video data 102. The input video data 102 is used to determine predicted data via intra-prediction module 108 and/or motion estimation/compensation module 110. The predicted data is compared to the input video data 102 to determine residual video data (e.g. differences between the predicted video data and the input video data 102). The residual video data is further processed via a transformation/quantization module 104. The transformed/quantized residual data is entropy encoded via entropy encoding module 106 and output as compressed video data. Encoder 100 also includes an inverse quantization/inverse transformation module 114. The inverse quantization/inverse transformation module reconstructed the residual video data. The output of the inverse quantization/inverse transformation module 114 is fed to a predictor that generates a reconstructed version of the original input video data 102. The reconstructed version of the video data may be used to determine any distortion introduced due to the transformation/quantization performed at transform/quantization module 104 and/or any distortion resulting from the prediction. The reconstructed version of the video data is further processed by in loop filters 116 and stored in decoded picture buffer 112. The images in the decoded picture buffer 112 may be used by motion estimation/compensation module 110.

In some embodiments, the in loop filters 116 may include a de-blocking filter 118, a SAO filter 120, and an adaptive bilateral filter using look-up tables 122, as described in more detail herein.

In some embodiments using such an adaptive bilateral filter may provide additional coding benefits, e.g. improved rate distortion performance and subjective quality. In some embodiments, a bilateral filter may be used in combination with other coding tools. However, bilateral filters may be quite complex, e.g. they can require divisions and other floating-point based operations, which may make them difficult to support within the context of a video coding system. To reduce such complexity an approximation method may be used based on a look up table (LUT) approach. This process may result in an offset parameter to be added to a central pixel position. To also bound the complexity of the process, bilateral filtering may be limited within a neighborhood of pixels, such as plus or minus 1 pixel from a central pixel position. A further simplification may also considered where only the vertical and horizontal neighbors neighboring pixel position are used. In some embodiments, use of look-up tables may simplify calculations by only involving summing and multiplication and not division using floating point decimals. In some embodiments, adaptive bilateral filtering using look-up tables may be used in encoders/decoders as defined by MPEG, such as HEVC or VVC. Also in some embodiments, adaptive bilateral filtering using look-up tables may be used in encoders/decoders as defined by AV2, such as AOM.

In some embodiments, a bilateral filter may be used in addition to or in place of a de-blocking filter, sample adaptive offset (SAO) filter, and/or an adaptive loop filtering (ALF) method. In some embodiments, a bilateral filter may be used in parallel with an SAO filter. In such an embodiment, the same pixels may be processed in parallel using both the SAO and bilateral filter process, and then both the implicit offset that was derived through the bilateral processing and the explicit offset derived and signaled through the SAO process may be added. More specifically, instead of executing both filters in a serial manner, e.g. SAO(BIF(I(x, y))) both filters may act on the input sample I(x,y), to create delta values.

$$\Delta_{BIF}=\Delta(I(x,y)) \text{ and } \Delta_{SAO}=\Delta SAO(I(x,y))$$

and can thus be executed in parallel. The final pixel value is constructed as $$I_{filt}(x,y)=\text{clip}(I(x,y)+\Delta_{BIF}+\Delta_{SAO}).$$

In some embodiments, look-up tables are selected based on quantization parameters (QPs) of a current pixel to be processed.

The entry of the LUT is determined based on the difference between the current pixel and its neighboring pixel, that is computed as follows:

$$\text{index}_{i,j}=((I(\text{pad}(x+i,y+j))-I(x,y))+4)>>3,$$

where i and j denote signed integer values in between [−1, 1]. For this equation as well as all following, the case i=j=0 is disregarded. In the case that a neighboring pixel is unavailable, e.g. the pixel is on the boundary of the image or tile, padding is applied using the function pad(m,n). Afterwards the absolute value of the index is clipped to fit into the range of LUT entries:

$$\text{LUT\_index}_{i,j}=\text{clip}(\text{abs}(\text{index}_{i,j}),15)$$

Based on the sign of $\text{index}_{i,j}$ and the luma QP value of I(x,y), the offsets can be calculated for each position. In the case that $\text{index}_{i,j}>0$ $$\text{LUT\_value}_{i,j}=\text{LUT}[\text{LUT\_index}_{i,j}],$$

otherwise:

$$\text{LUT\_value}_{i,j}=-\text{LUT}[\text{LUT\_index}_{i,j}]$$

This can also be seen as:

$$\text{LUT\_value}_{i,j}=\text{sign}(\text{index}_{i,j})*\text{LUT}[\text{LUT\_index}_{i,j}]$$

Figure 2:
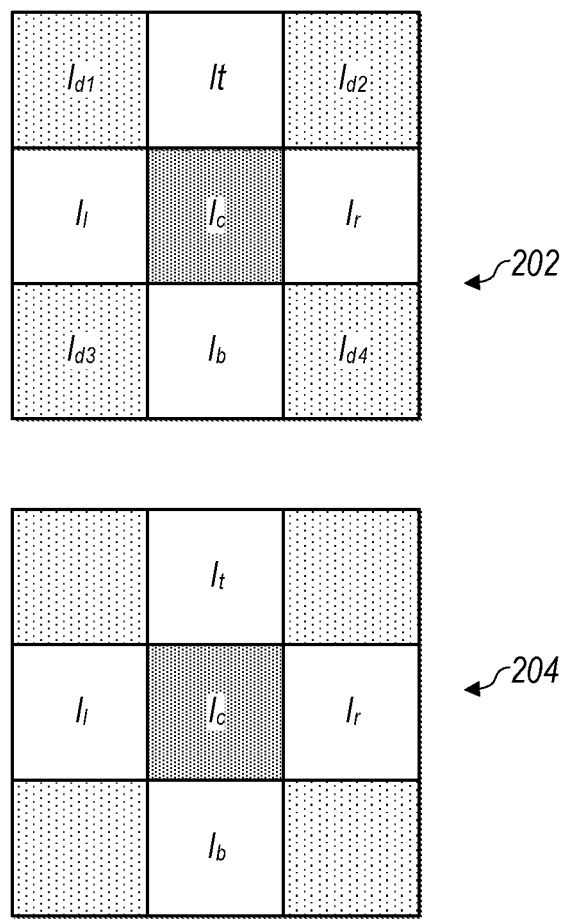
FIG. 2 illustrates example neighboring pixel arrangements used by an adaptive bilateral filter that uses look-up tables, according to some embodiments.

The result may further be weighted based on the spatial distance between the current pixel and the corresponding neighboring pixel. In some embodiments, only the 8 closest neighbors (8-connected neighborhood) are considered for each sample, this weighting process impacts the diagonal positions, e.g. by scaling the result of the LUT by ½. For example, 202 in FIG. 2 illustrates an embodiment with 8 connected neighbors. Also, 204 in FIG. 2 illustrates an embodiment with 4 connected neighbors.

In some embodiments, the calculated LUT values are then summed up as follows:

$$\text{sum} = \sum_{i=-1}^{1} \sum_{j=-1}^{1} \text{LUT\_value}_{i,j}$$

and further weighted with a factor k, depending on the size of the filtered block, e.g.

$$\text{sum}=(k*\text{sum})>>1$$

The derivation of the factor k, which is based on the CU block size and the prediction mode of the current block is shown in table 1 below:

TABLE 1

| | |
|---|---|
| k = 1 | min(wTb, hTb) ≥ 16 |
| k = 3 | min(wTb, hTb) == 4 && CuPredMode[ xCuY ][ yCuY ] == MODE_INTRA |
| k = 2 | otherwise |

The final offset value Δ_BIF is then computed by dividing the sum variable by 16 as follows:

$$\Delta_{BIF}=(\text{sum}+8)>>4$$

In some embodiments, adaptive bilateral filtering using look-up tables may be used not only in the context of video coding, e.g. inside the video coding loop, but also for the application of bilateral filtering for enhancement applications, e.g. out of loop de-noising.

Improvements to Reduce Positive Number Bias

Assuming an unsigned integer x that is divided by $2^n$ then the method described above introduces a bias towards positive numbers:

$$g(x)=(x+2^{n-1})>>n$$

This bias is introduced, when:
i. The index of the LUT is determined
ii. Weighing the LUT values due to increased spatial distance (e.g. the diagonal neighbors)
iii. Calculating the final offset value To eliminate the bias, in some embodiments, the following approach may be used:

$$f(x)=\text{sign}(x)*((\text{abs}(x)+2^{n-1})>>n)$$

Figure 3A:
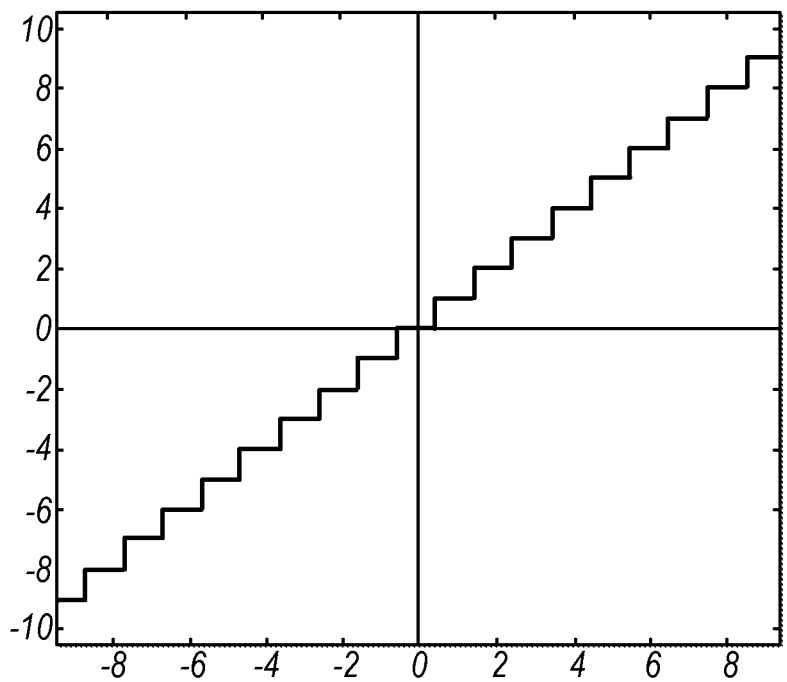
FIGS. 3A-3B illustrates example calculations results eliminating a positive number bias, according to some embodiments.
Figure 3B:
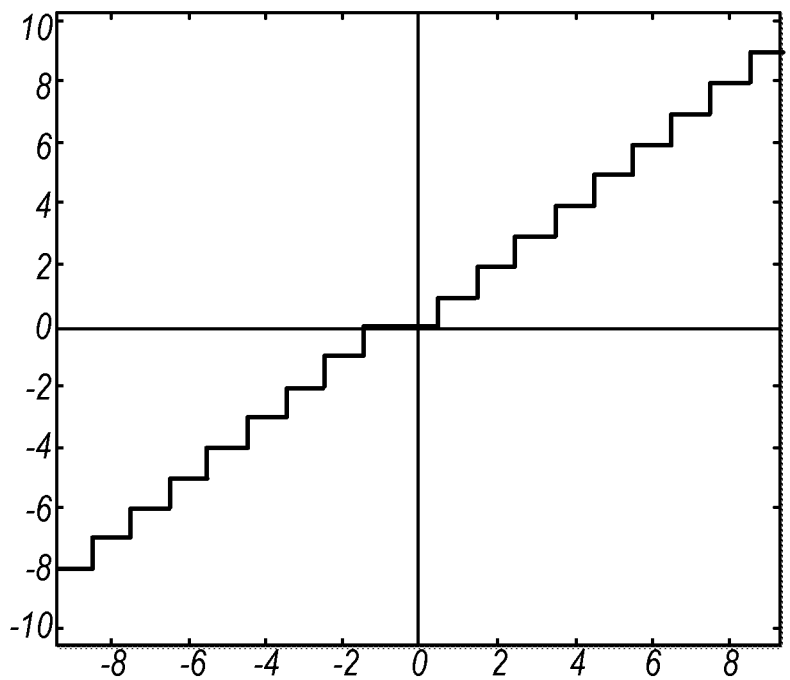

For example, FIG. 3A illustrates results with the bias eliminated, whereas FIG. 3B illustrates the original approach described that introduces positive number bias.

Improvements for HDR, Hi-Bit Depth, and Other Block Characteristics

In some embodiments, LUTs may only be suitable for 10 bit input data. The LUTs may also likely be optimized for content represented using the video range representation and most likely for Standard Dynamic Range (SDR) material. To improve on this, in some embodiments the input bit depth and, optionally, the dynamic range and type of content may be considered. This can be achieved by either specifying within the codec different LUTs for each different bit depth, range, or content characteristics (transfer characteristics, color primaries, matrix coefficients etc.), or by adapting the calculation of the LUT index and the final offset value. For example a different LUT may be used for BT.2100 PQ YCbCr content versus other video material that utilize the BT.709 YCbCr representation or the BT.2100 HLG YCbCr representation. In the case where the calculation is adjusted based on the bit depth the input data may be adjusted according to a nominal bit depth, e.g. 10 bits, and then this information may be fed into the LUT. In particular, in one embodiment, assuming that the input bit depth is less than 10 bits the bit depth can be adapted by computing:

$$I_{10b}(x,y)=I(x,y)<<(10-\text{InternalBitDepth})$$

If the bit depth is more than 10 bits, the adaptation is performed as follows:

$$I_{10b}(x,y)=I(x,y)>>(\text{InternalBitDepth}-10)$$

If it is also desirable to consider the sample range, e.g. for full range content and assuming the LUTs are optimized for video range material, the process can be further adjusted as follows:

$$I_{\underset{vr}{10b}}(x, y) = I_{10b}(x, y) * \frac{896}{1023} + 64$$

To adjust the process for SDR material it could be assumed that I corresponds to the non-linearly transformed luminance, instead of luma signal. Therefore, the signal could then be first linearized, e.g. for PQ content by applying the PQ EOTF, and then converted to a BT.709 signal, assuming the LUTs were optimized for such signals, by applying the BT.709 inverse EOTF process.

Specifying different LUTs within the codec or adapting the calculation of the LUT index and the final offset value for samples based on the prediction type of the current sample (center pixel), may also be desirable. As an example, usually errors in intra blocks within a P or B coded picture or slice have different characteristics due to, usually, inferior prediction compared to errors in inter predicted blocks. Therefore, it may be better to apply stronger filtering on intra predicted blocks compared to inter predicted blocks. This may be implicit, e.g. the filtering strength could be adapted based on the block's and/or its neighborhood coding modes, or could be signaled and controlled further in the bit stream, e.g. there is a control parameter that signals whether the mode of the block and/or its neighborhood blocks would be considered to adjust the filtering strength or not. In another example, the error distribution among neighboring samples for certain directional intra prediction modes (e.g. Horizontal, vertical or diagonal (45/135 deg.)) can be different compared to smooth intra prediction modes such as planar or DC. It may be desirable then to also adapt the filtering strength also based on the intra prediction mode type. Block size could also be another classifier for altering filtering strength. For inter modes, the reference index and the motion vector range could also be considered.

Padding Improvements

In some embodiments, such a scheme can operate at a variety of levels, including only within a CU/block, a CTU/macroblock, slice, tile, brick, or picture boundary. Depending on the level, padding may have to be applied at the boundaries of such level. The proposed bilateral filter in described above uses mirroring for padding for any positions, e.g. the positions on the top, left, right or bottom, that might be unavailable. In some embodiments, other padding schemes could also be used, such as boundary replication, extrapolation, introducing a constant value at the boundaries, e.g. by padding with a zero value or with the middle range value, circular padding etc. Another alternative is to not use padding and only use available samples with modified weights based on the number of available samples.

Whether padding is used can be signaled with a flag, e.g. bif_use_padding within the sequence parameter set (sps), picture parameter set (pps), adaptation parameter set (aps) or slice header etc. However, if the padding method is also controllable, a parameter instead of a flag could be signaled instead. Another alternative is to disable bilateral filtering for a current sample when the number of neighboring samples marked as unavailable is greater than a threshold. The threshold to determine such a decision could be fixed or signaled within the sps, pps, aps or slice header. This may help in avoiding or reducing dragging issues that may be typical at image or partition boundaries due to padding.

Figure 4A:
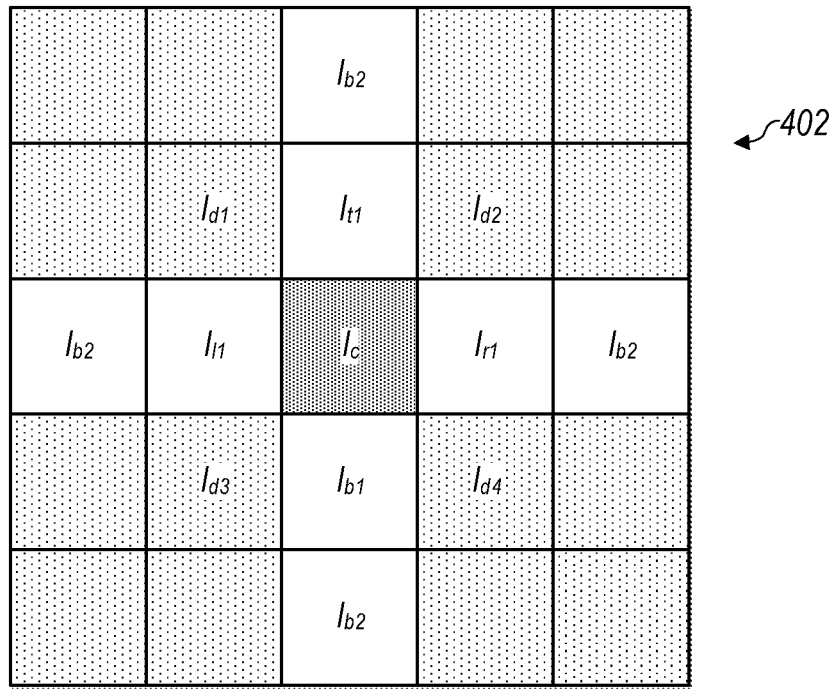
FIGS. 4A-4B illustrate example neighboring pixel arrangements used by an adaptive bilateral filter that uses look-up tables, according to some embodiments.
Figure 4B:
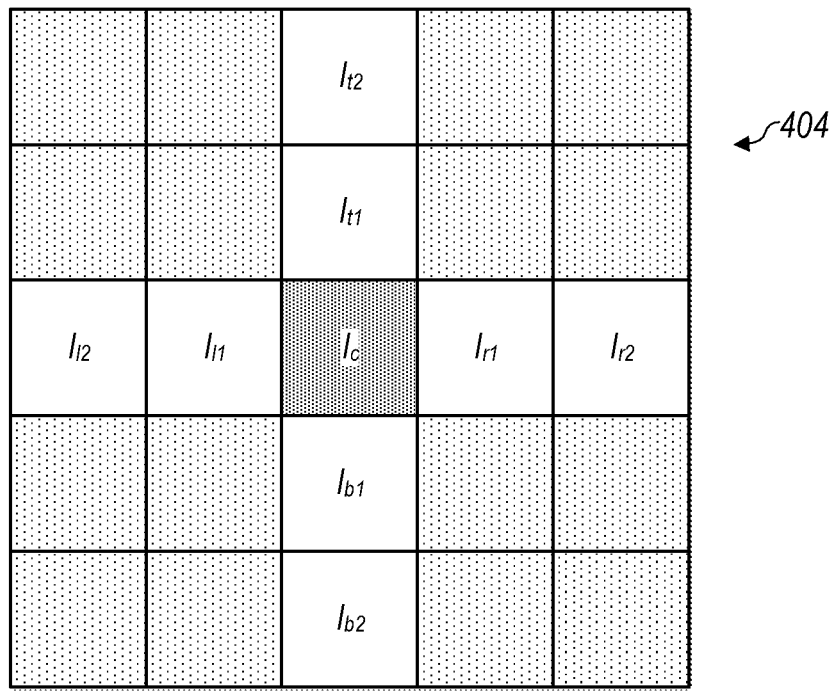

Improvements to Vary Quantity and/or Configuration of Neighboring Pixels Considered In some embodiments, a different number of neighbors could be considered for this process. The number could be fixed for the entire sequence, but could also be signaled and adjusted per frame, slice, or even CTU. For example, instead of only considering the eight directly neighboring samples (8 connected neighborhood), a larger area around the central sample could be considered instead. Alternative, the 4 connected neighborhood or more than 8, e.g. 24 connected, could be used. In some cases also the use of a diamond or circularly shaped sampling area might be advantageous over the use of a squared one for this process. Filtering may be improved while increasing only moderately the number of samples considered for filtering compared to the number of samples that would have otherwise be considered when using a squared filter area. Obviously samples further away from the center, e.g. samples with a distance of two compared to the center, would apparently increase the range of the filter, however at the same time their complexity needs to be considered. Regardless, appropriate scaling of the resulting LUT values for such samples is necessary due to the increased distance from the center sample. Examples for alternative sampling areas are shown in 402 and 404 of FIGS. 4A and 4B.

In some embodiments, different look-up tables may be used for intra-predicted blocks, slices, etc. as compared to inter-predicted blocks, slices, etc. Also, in addition pixel values from previous or subsequent point in times (e.g. other frames) may be used for bilateral prediction. In some embodiments, previous or subsequent frames may be used to determine how much motion is present and QPs may be adjusted based on motion. Thus may result in different LUTs for different QPs being used for the bilateral filtering.

Improvements to Use Time as Third Dimension in Bilateral Filter

Figure 5:
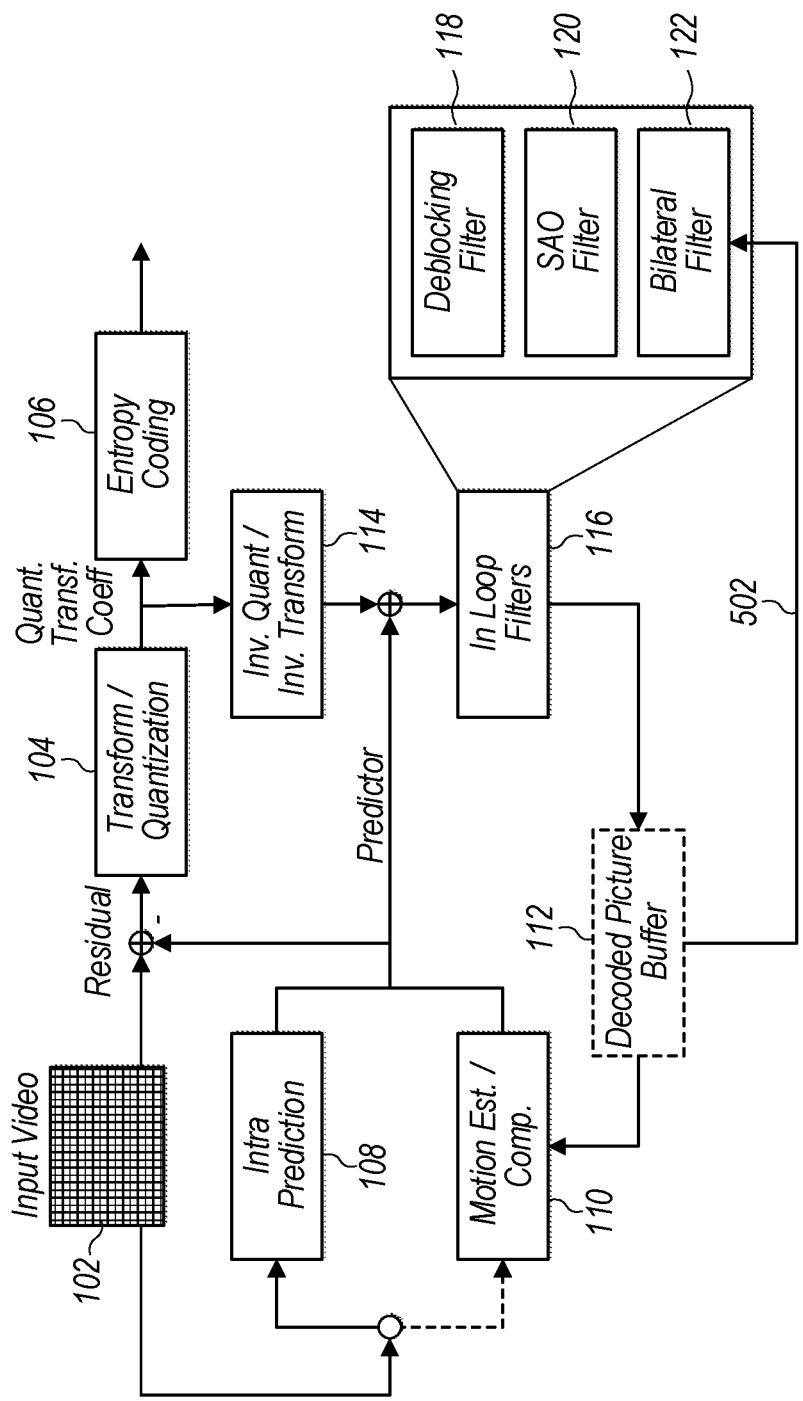
FIG. 5 illustrates an example encoder that may include an adaptive bilateral filter that uses look-up tables, wherein the adaptive bilateral filter uses preceding image frame pixels, according to some embodiments.

In some embodiments, process could be extended also to include temporal candidates, e.g. by also considering the co-located pixels and their neighbors in previous and/or future frames, if those are available. Similar or different weighting could apply to temporal candidates versus spatial ones. In this case, the implementation can be considered as a 3D bilateral filtering scheme. For example, FIG. 5 shows images for previous time slots from decoded picture buffer 112 being provided to bilateral filter 122 of in loop filters 116.

Improvements to Adjust LUTs Based on Content Being Filtered

In the process initially described above, fixed LUTs were discussed. However, fixed LUTs may not be optimized for the content being filtered. Thus, in some embodiments, adaptation of the LUT coefficients based on the content, which can be computed at the decoder or signaled either in the sequence, picture parameter sets, slice or tile header (or similar high level syntax structures if supported by the codec) may be used. Multiple such LUTs could be signaled, and they could be made persistent (e.g. not dumped after the decoding of a frame and reused for multiple future frames) and adjustable. If multiple LUTs are signaled, then at a lower level an index to the appropriate LUT could be signaled as well. For example, on the CTU level there could be a parameter bif_LUT_index, which signals the index to a previously signaled LUT. This index would only be signaled if before on a higher level a flag bif_signal_additional_LUT is set to 1. An example signaling in the SPS could be as follows:

| | Descriptor |
|---|---|
| sequence_parameter_set( ) { | |
| ... | |
|   sps_use_bilateral_filtering | u(1) |
|   if(sps_use_bilateral_filtering) { | |
|     sps_number_of_bilateral_luts_minus1 | u(4) |
|     for(i = 0; i < sps_number_of_bilateral_luts_minus1; i++) { | |
|       sps_lut_number_of_bins_log2[ i ] | u(3) |
|       for(j = 0; j < 2^(sps_lut_number_of_bins_log2 [ i ]; j++) | |
|         sps_lut_coefficient[ i ][ j ] | u(8) |
|     } | |
|   } | |
| ... | |
| .. | |

An alternative could be to signal the sps_lut_coefficient as a delta value, where the delta is computed based on the previous indicated coefficient for the current LUT. In this case, change the signaling type could be changed from u(8) to se(v).

In some embodiments, a lower level, e.g. PPS or slice header, signaling of LUTs could be predicted from a higher level version, e.g. in the SPS. In that case, instead of signaling the number of bins we can signal from which higher level, e.g. SPS, LUT the current one would be predicted from, and then for all the coefficients signal their difference versus the higher level LUT.

Additional considerations could also be made as follows:
i. The size of the LUT could be the same as described above with 16 entries. However, different, e.g. smaller, e.g. 8, or larger, e.g. 32, LUT size could also be used, which could provide a coarser or finer LUT. In that case, the LUT length would also be signaled in the corresponding HLS structure and considered to determine the appropriate LUT entry for each neighboring sample. In addition to setting bif_signal_additional_LUT to 1 a parameter, e.g. bif_LUT_length would indicate the length of the signaled LUT.
ii. Instead of signaling all coefficients for the LUT, only signal a subset of these and interpolate the missing coefficients based on a specific interpolation method (e.g. bilinear or bicubic). The interpolation could be known or could be signaled inside the bit stream. The interpolation process could allow saving some overhead and therefore potentially saving bits and improving the coding efficiency compared to sending the values explicitly, especially if those values are signaled frequently. An example of linear interpolation of every second coefficient may be signaled and intermediate coefficients interpolated. Instead of interpolating in the linear space a transformation to the log domain might lead to a better LUT.
iii. The LUT could be based on training (e.g. using a machine learning process). Commonly higher coefficient values are expected for smaller differences compared to the center pixel value versus its neighborhood, while the coefficient values should decrease when the distance is larger.

Improvement to Consider QPs for Neighboring Samples

Figure 6:
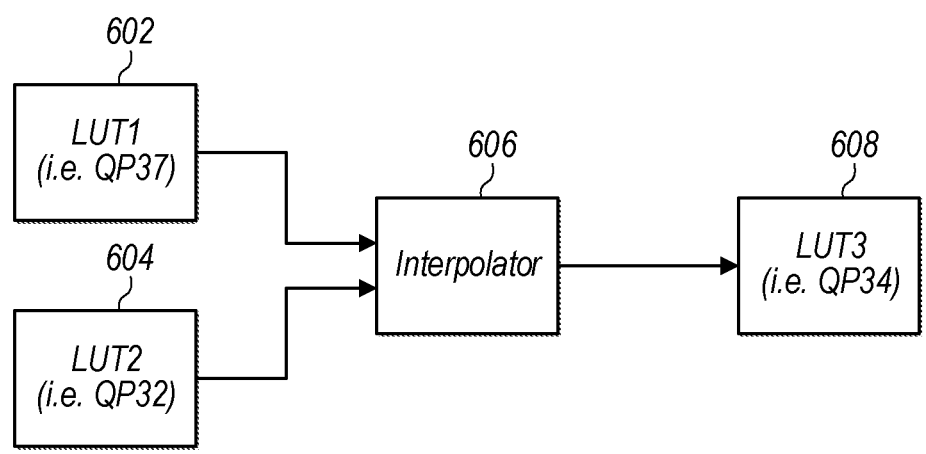
FIG. 6 illustrates, a process of interpolating a look-up table based on two signaled look-up tables, according to some embodiments.

In some embodiments, LUTs may be specified for pixels based on a QP range associated with the given pixel being considered. However, this may not take into consideration what QPs were used for neighboring samples. For example, for a sample at the boundary of a quantization group in a codec like HEVC or VVC, its neighbors may belong to a different quantization group and may be associated with a larger or smaller QP. This can lead in those samples as well as all samples belonging to a particular quantization group being filtered potentially differently compared to neighboring quantization groups. This may introduce artifacts at the block boundaries. As an alternative, considering the neighborhood QPs as well during this process may be applied. For example, instead of considering the actual QP for the pixel, an averaging could be performed with its neighborhood and utilize the average QP for the selection of the LUT. More LUTs could also be defined for a finer range of QPs (or even have an LUT per QP). Such LUTs could be generated through an interpolation process, e.g. by performing a bilinear or other interpolation across consecutive signaled LUTs. Extrapolation could also be used if the LUTs are not fully specified for the lower or maximum range. FIG. 6 shows the general workflow to interpolate between two LUTs. For example a look-up table 1 (602) and a look up table 2 (604) may be used by interpolator 606 to generate interpolated look up table 608. The QP to be used for a position could also be computed by considering the distance of the current sample from other quantization groups within a certain distance, and performing a distance based interpolation for the QP value. Then, using this distance based QP, the selection of the LUT would be made.

Improvements to Filter Chroma Values

Another extension to the ideas described above is the filtering of the chroma values. For example, the same LUTs could be used to filter the chroma components. Furthermore, for a given luma weight case the associated chroma weight tables could also be provided. The process may alternatively be performed in a different color domain, e.g. in RGB or ICtCp, assuming that the content is either in 4:4:4 format or if on the fly interpolation is permitted, color conversion, and down sampling from one format to the next.

In some embodiments, chroma may be sampled at a different rate than luma. Thus different LUTs (and resulting offsets) may be used for chroma as compared to luma. For example, for lower sampled chroma values, less filtering may be used to avoid bleeding in values from further away samples. For example, the chroma samples may be further away from each other because the sub-sampling skips values in the chroma as compared to luma.

Improvements to Avoid Negative Values in the LUTs

Following the nature of the bilateral filtering process to conserve sharp edges, which are part of the original signal, adapting the LUTs and setting the last entry to zero or a positive value is suggested. Besides the preservation of sharp edges by having only positive values in the LUTs reduces the number of bits necessary to store the entries. Furthermore, we do not need to be concerned anymore about rounding operations, saving potentially computation steps in the filtering process.

Improvements Regarding Quantization

In some embodiments, instead of dividing the absolute distance by 8 (shift by 3) and clipping the result to the maximum bin of the LUT, a different quantization control value may be selected for that distance. That control value could be implicit, or could also be signaled with the LUT. Then the clipping is performed. Alternatively, the clipping could be done before the quantization is applied, while guaranteeing that the values would remain within the LUT range.

Improvements to Merge Calculation Steps

In some embodiments, instead of calculating BifOffsetVal[xTuY+x][yTuY+y] with the intermediate step of first calculating cmsum, it is proposed to merge these two steps into one. In this case, the offset value can be calculated as:

$$\text{BifOffsetVal}[xTuY+x][yTuY+y]=((\text{strength}*m\text{sum})+16)>>5$$

This may reduce the number of operations needed for the calculation.

Improvements to Toggle Bilateral Filtering or Bilateral Filtering Parameters

In some embodiments, whether bilateral filtering is to be applied may be signaled in the sps and on a CTU level. It is possible, that a particular encoder implementation to encounter a "panic mode" in this scenario because of the delay introduced when processing samples by the bilateral filter. It might also be helpful to allow control on the pps, slice header, or tile level. Besides only allowing on/off control of the filter signaling of additional offsets or adjustments of the LUT parameters may be applied. With such control, controlling the use of the bilateral filter would not only help for "panic mode" scenarios but also as a mechanism to control the quality of the reconstruction process.

Improvements to Include Bilateral Filtering in SAO Calculations

The filtering process as described above could actually be seen as an adaptive and implicit SAO process since its outcome is an offset that needs to be added to each pixel based on its neighborhood characteristics. Therefore, instead of performing this process in parallel to the SAO process, it could be considered as a "special" SAO mode, that could be enabled adaptively for each CTU. Currently, for example, the SAO process supports two modes. The band offset and the edge offset mode. These explicitly send offsets for the different classifiers that are supported in such modes. In some embodiments, a 3rd mode may be introduced, called "implicit" SAO, that now utilizes the above described process to generate the offsets.

Additional Signaled Parameters

In some embodiments, instead of only considering the QP of the block and/or its neighborhood for the selection of the LUT, an additional parameter could be signaled that would adjust the selected index of the LUT. This could be done, for example by adding this parameter to the original QP, while also considering a clipping process that would ensure that there is no overflow when accessing the LUT table.

Distance Computation Adjustments

Furthermore, in some embodiments, there could also be an adjustment in the distance computation. An additional offset (positive or negative) could be added to bias towards a particular entry in the selected LUT. This could help in reducing or increasing the strength of the filtering process.

Improvements to Further Adjust Approximated Values Retrieved from the LUTs

In some embodiments, the offsets computed may only consider the distance but not the actual value of the sample. However, it might be desirable to adjust the offset also based on the brightness of the sample. For a brighter sample a larger offset may be added while for a dimmer/darker sample a smaller offset may be more appropriate. This requires an additional modulation/multiplication of the offset based on the intensity of the current sample. In some embodiments, brightness considerations may be banded, such that if the brightness fell within one band a particular additional adjustment value would be signaled, and if it fell within another band a different particular adjustment value would be signaled.

Improvements to Include Bilateral Filtering as a SAO Mode

Figure 7:
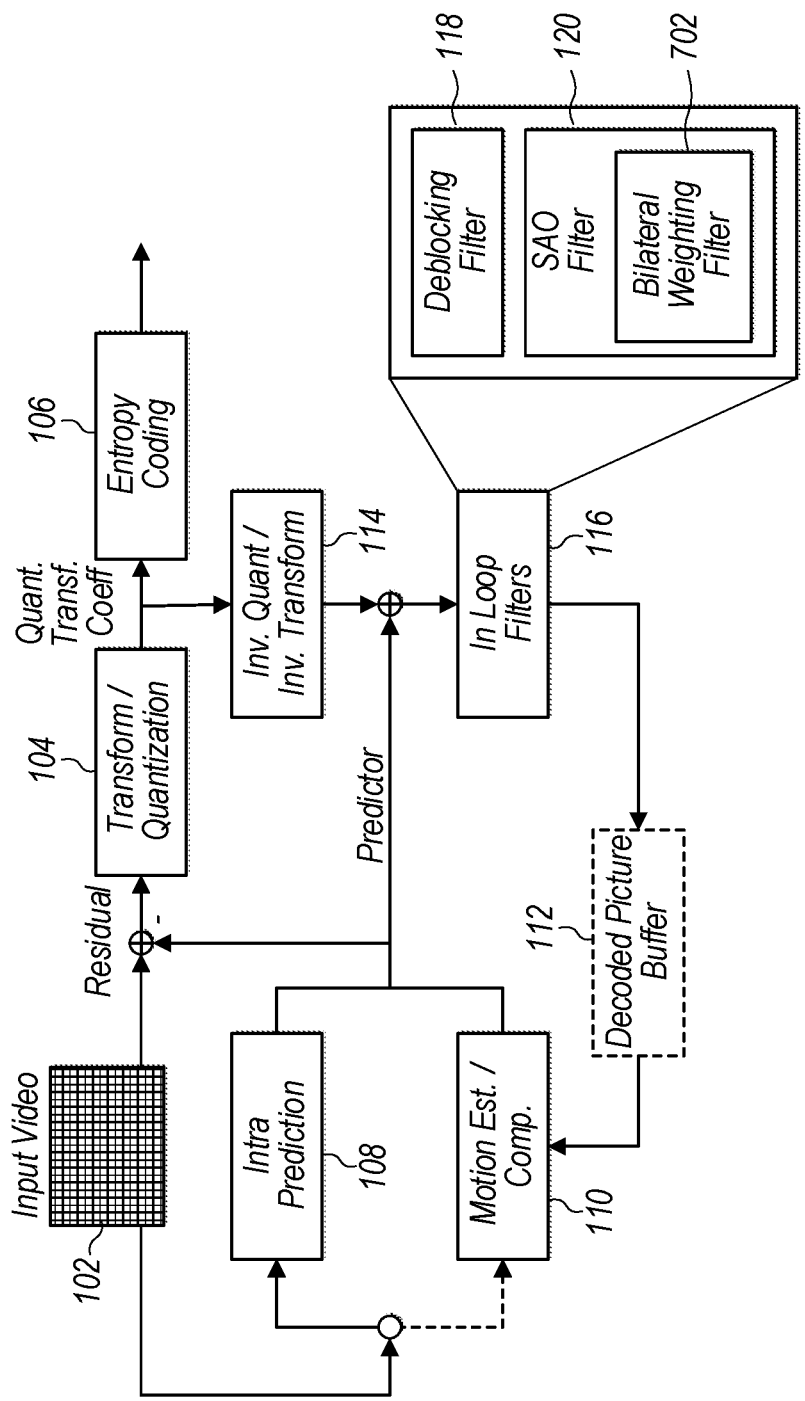
FIG. 7 illustrates an example encoder that may include an adaptive bilateral filter that uses look-up tables as part of a sample adaptive offset (SAO) filter, according to some embodiments.

In some embodiments, an alternative would be to create an additional SAO mode where SAO offsets are still signaled e.g. based on the edge offset method. However, in this case the signaled offset values could be adjusted by the value that would be generated using the LUT process. Unlike the process described above where the two offsets are additive, in this case the signaled offset is scaled by the derived parameter. In this case, it may be desirable to also adjust the process of how the SAO classification is performed, e.g. in this the delta for the edge offset classification may be "quantized" instead of only considering that a sample is larger or bigger than its neighbor (e.g. also consider the difference amount). For example, FIG. 7 illustrates SAO filter 120 that includes bilateral filter weighting module 702 as part of the SAO filter 120.

Improvements to Use Results of Bilateral Filtering in SAO Calculations

In some embodiments, if both SAO and bilateral filtering are performed to compute two additive offsets, it is more optimal, from the encoder side, to first compute the bilateral offset based on the original samples, while for the regular SAO process consider the original samples for the classification but perform the computation and optimization of the additional SAO offset based on the modified samples that also consider the bilateral offsets. In this way the final combined offset would be more optimal.

Improvement to Utilize Prediction Data to Adjust Bilateral Filtering

In some embodiments, the adaptive bilateral filtering using look-up tables could also be controlled based on the mode type and size of the current block, but also certain characteristics of the prediction that may have been used for the current block and/or its neighbors that are considered for filtering. For example, different/stronger filtering may need to be applied if the motion vector used for the current pixel is above a certain threshold or within a certain range of motion. If the block also used affine motion compensation or weighted prediction different filtering could be used. Intra versus inter coded blocks may also use different filtering strength while the strength could be increased or decreased based on the prediction block size. The filter could also be disabled for all or some pixels (e.g. for boundary or inner pixels) again based on similar conditions. Other modes, such as intra block copy may also impact this mode. For example, it may be desirable that if the block is coded using an intra block copy mode or fractal prediction, and if there is no residual for this block, and if the associated QP for this block is above a certain threshold that this is implicitly turned off without having to signal any flag for its usage. In other cases, however, the flag may be sufficient for such consideration. Other cases that may also require not using the bilateral filter may include when palette or lossless modes such as PCM modes in codecs like HEVC are used. Alternatively, an enable flag could be signaled in the sps, pps, slice, or other types of high level syntax headers that may exist in a codec, to indicate if this filtering mode should be enabled or disabled implicitly, without any further signaling (e.g. it is a forbidden mode) when the current sample to be processed or a neighbor to this sample was coded with a specific mode or block size, e.g. was coded in the intra block copy or palette mode.

Improvements to Use Bilateral Filtering in Prediction

Figure 8:
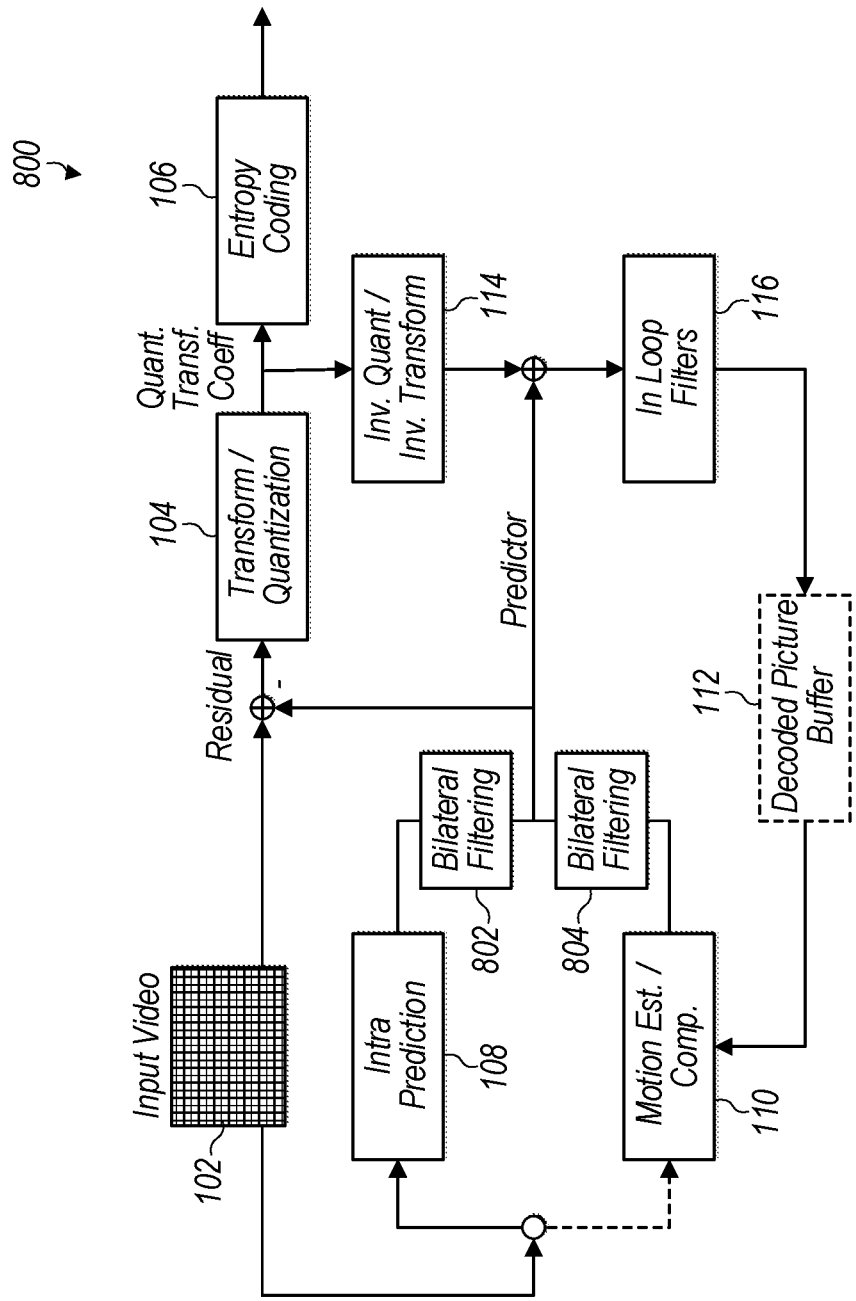
FIG. 8 illustrates an example encoder that may include an adaptive bilateral filter that uses look-up tables as part of prediction process, according to some embodiments.
Figure 9:
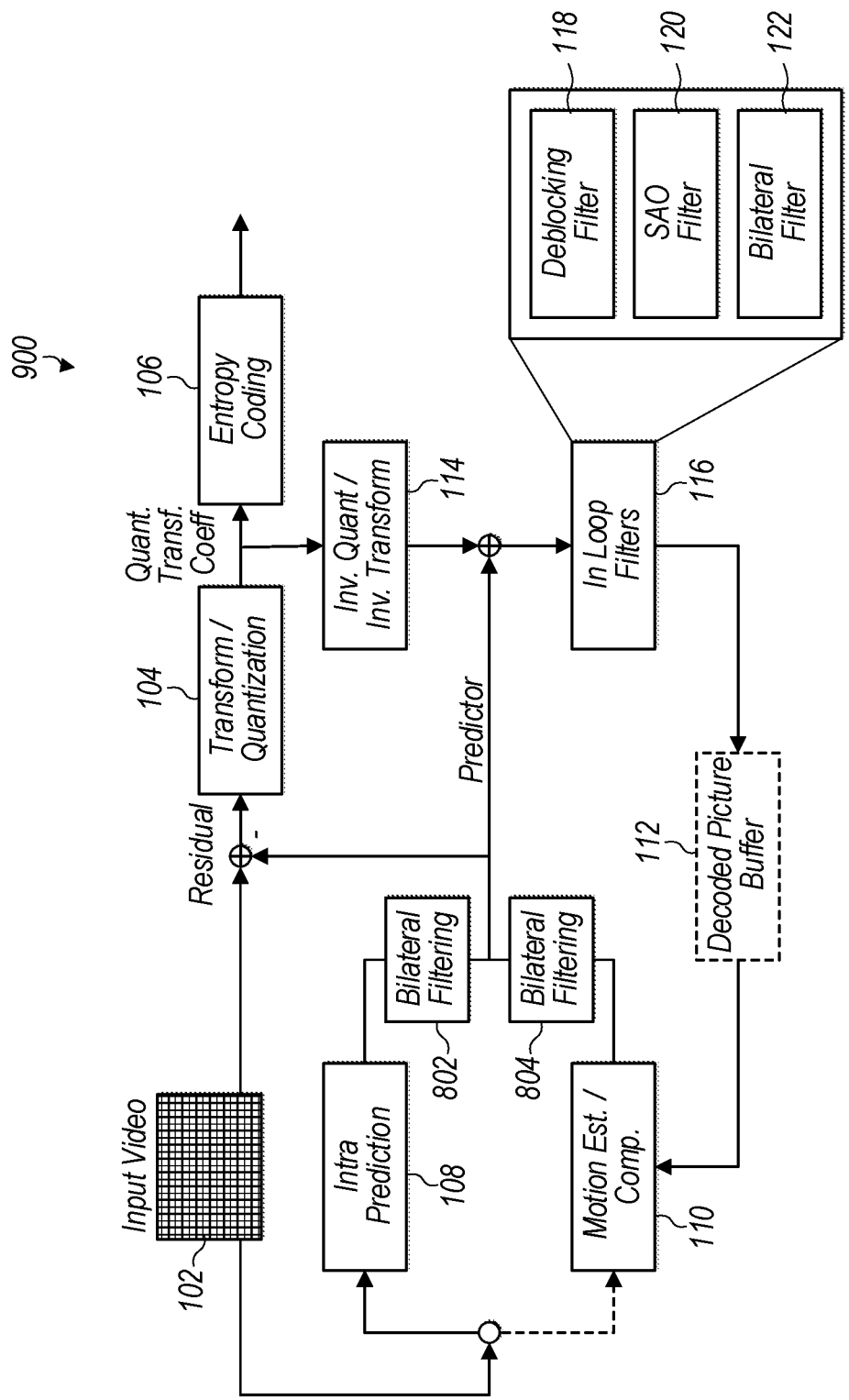
FIG. 9 illustrates an example encoder that may include an adaptive bilateral filter that uses look-up tables as part of prediction process and an additional adaptive bilateral filter that uses look-up tables as part of in loop filtering process, according to some embodiments.

In some embodiments, a bilateral filter could also be considered as part of the prediction process. If a particular intra or inter prediction mode is used, bilateral filtering could be applied on the prediction samples, as specified herein, to further refine those prediction samples. For example, for intra prediction, the neighboring samples, e.g. the samples on the left or the top from the current block, commonly used for prediction are first filtered using bilateral filtering prior to them being used to generate the prediction block, e.g. using directional prediction. Only the same samples in this case could be used for bilateral filtering, however, in an alternative embodiment also their neighboring samples that have already been reconstructed could also be used. Similarly, for inter prediction, bilateral filtering could also be applied on neighboring samples. Bilateral filtering in this case could be applied prior to the interpolation process or after the interpolation process. It could also be limited within the samples of the prediction block to be used, or allowed to also use samples outside the prediction block, if available. The use of bilateral filtering could be implicit, e.g. always enabled, or could be explicit. Explicit use could be signaled at the SPS, PPS, slice header, or even at the CTU and CU level. It could also be allowed only for certain prediction modes, e.g. only for intra, or for inter of a certain block size, if global motion compensation (GMC) is enabled or disabled, or if the motion vectors of the current block are within a certain range. These different options could also be signaled at different levels of the bit stream or be pre-decided. For example, FIG. 8 illustrates encoder 800 that includes bilateral filtering 802 and 804 as part of the prediction process. In some embodiments, in-loop filters 116 may also include bilateral filtering as described in FIG. 1, 5, or 7. For example, FIG. 9 illustrates encoder 900 that includes both bilateral filtering processes 802 and 804 used in prediction, but also bilateral filter 122 included in in-loop filters 116.

In some embodiments, the subpixel generation process for inter prediction is performed using the original, unfiltered samples. In this case, the filtering process is applied after the motion compensation is performed. This can be seen mathematically as prediction(x,y)=Filter(MC(x,y)). This has the advantage that filtering only needs to be performed on the final window that corresponds to the size of the block that is being motion compensated, which results in a complexity reduction.

In some embodiments, the filtering process is performed prior to the subpixel generation process. This can be seen as prediction(x,y)=MC(Filter(x,y)). This may result in a bit better performance, but this may require that the encoder/decoder filter all samples within the MC interpolation window (e.g. not only the pixels in the center of the block from which we are motion compensating, but also the additional samples from the left, right, top, and bottom of that block that are needed for the subpixel interpolation process; the size of the window is dictated by the block size as well as the filter length/taps of the motion compensation interpolation filter.

In some embodiments, in another alternative and to not increase the number of filtering operations, the bilateral filtering could be restricted to be applied only in the center block, while the samples that are outside of that block and which are used for the subpixel interpolation are left unfiltered. In this scenario the interpolation filters used may be altered so as to give higher strength to filtered positions than the unfiltered ones when interpolating.

It is also possible to consider a hybrid approach. That is, instead of filtering only the center positions of the prediction block or all positions needed for the subpixel interpolation, both the prediction block and some of the boundary samples (e.g. the M nearest columns on the right/left and the N nearest rows on the top/bottom, with M or N potentially being smaller than the number of samples required for filtering from each side) are filtered. Different number of samples could also be considered from the left versus the right side or from the top versus the bottom side if also desired. This again can reduce filtering complexity but with less impact on quality.

In some embodiments, filtering may only be enabled for some subpixel positions and not for other subpixel positions. E.g. Filtering is only used for integer, or for integer and half pixel positions, while it is disabled for all other positions. This can also help reduce complexity. All methods previously described on which samples could be filtered, still apply. In this case the signaling of the filtering mode can be saved.

In some embodiments, the above methods could be predefined in the encoder/decoder, but could also be signaled. In the latter case a system can support multiple of such methods and the encoder can signal to the decoder, within different levels of the syntax (SPS, PPS, Slice/Tile headers. Block level etc.), which method to use. The method to use could also depend on aspects such as the motion vector subpixel position. That is, for motion vectors signaled with the vectors only at integer or half precision, then method that restricts filtering to the center of the block could be used, for all other positions the hybrid approach may be used, etc.

In some embodiments, similar considerations could be considered for luma versus chroma, with a system allowing different filtering or disabling filtering for the chroma positions versus the luma positions, depending also on the motion vector precision.

In some embodiments, similar strategies could also be considered by an encoder to reduce complexity (this is a non-normative aspect). For example, in a system that the decoder expects to filter all samples as described in scheme where the filtering process is performed prior to the subpixel generation process, the encoder may reduce the complexity of the different stages of the motion estimation process by partially filtering the samples at those stages. For example, many encoders first perform an initial motion estimation phase with integer displacement around a particular center or centers. That center may also be in integer precision (in which case obviously always only the integer samples are filtered) while in other cases such center may be also at subpixel precision. It may be easier in this case for the filtering to be performed on the entire image and before motion compensation since then the encoder does not have to filter the positions every time when performing a search. A similar but less complex filter could be used in this case so as to again reduce complexity. This obviously implies that an additional memory for storing such a filtered image is needed in the encoder. An alternative would be to filter the positions on the fly using the restricted window approach. After this step is performed then the encoder may perform subpixel refinement. At this stage the encoder may prefer to perform the subpixel refinement using a more accurate method of how to generate the prediction samples. Similar strategies could also be applied if a hierarchical motion estimation is used.

When filtering is applied during the motion estimation process the filtered reference as well as the unfiltered reference may be matched against the filtered source in order to derive the best matching motion vector. In a later mode decision process it can then be decided whether or not the reference block should be filtered or not, by testing the different reconstructions (filtered prediction+residual vs. unfiltered prediction+residual) against the original source. The attached figure can hopefully give you some further insight (ME/MD).

When performing motion estimation and compensation using prediction filtering, in some embodiments, the source and not only the reference may be filtered with a similar filter. This can help in finding a better match between the reference and the source. If no filtering is evaluated, then the encoder may switch and try to match the original source (unfiltered) with that reference.

In some embodiments, similar concepts may be extended for intra prediction. For intra prediction commonly samples are generated from horizontally and/or vertically adjacent samples. In other cases, e.g. in the intra block copy method, prediction is generated by using entire blocks of data previously coded in the same image. In such cases again filtering could be constrained to use only the samples utilized for the prediction process, or extended to use also samples that are neighboring to those used for the prediction. Different considerations could also be done to horizontal vs vertical samples used for the prediction process. The method again could be mode dependent, predefined in the system, or could be signaled in the bit stream, e.g. in the SPS, PPS, Slice header etc. For example, for the DC prediction mode the filtering could be disabled, while only enabled for all other directional prediction modes or for only certain prediction modes. I also attached a figure to visualize the main idea.

Improvements to Use Bilateral Filtering in Post Image Processing

In some embodiments, a bilateral filter may be applied as a post processing step instead of or in addition to as part of an in loop filter. When applying a bilateral filter as a post-processing step instead of the in-loop filtering process or as part of the prediction loop, the information described above could be included in an SEI to improve the output and make the filter more adaptive to the content characteristics of the original.

Example Computer System

Figure 10:
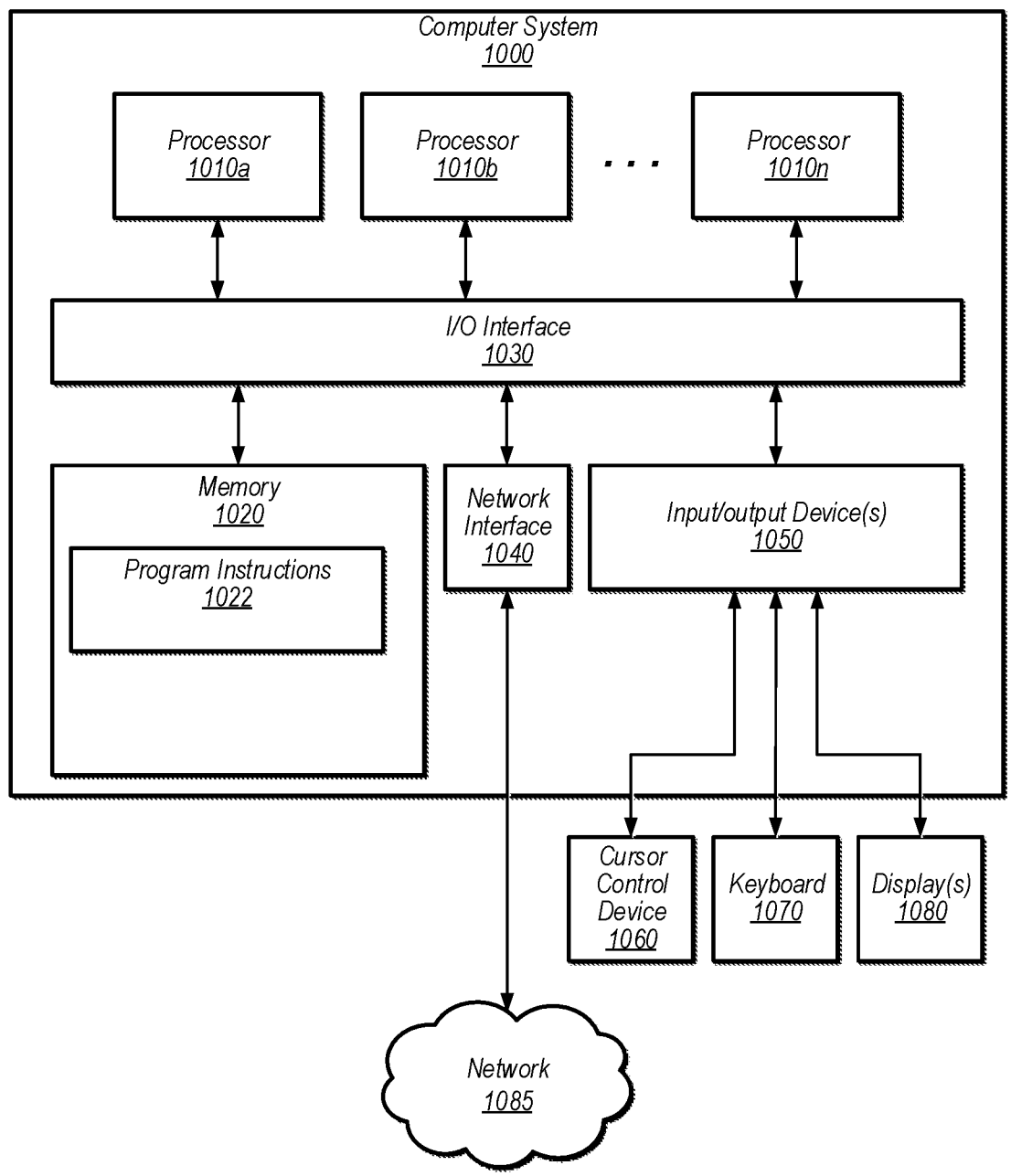
FIG. 10 illustrates an example computer system that may implement an encoder or decoder, according to some embodiments.

FIG. 10 illustrates an example computer system 1000 that may implement an encoder or decoder or any other ones of the components described herein, (e.g., any of the components described above with reference to FIGS. 1-9), in accordance with some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1000, which may interact with various other devices. Note that any component, action, or functionality described above with respect to FIGS. 1-15 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store point cloud compression or point cloud decompression program instructions 1022 and/or sensor data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement an image sensor control application incorporating any of the functionality described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method of decoding, comprising:
   determining an adaptive adjustment factor to be applied by a bilateral filter to pixel value data for an image of a video, wherein the adaptive adjustment factor is determined based on one or more characteristics of a portion of the image; and
   for respective pixels of the portion of the image for which a bilateral filter offset value is to be determined:
      selecting a look-up table from a plurality of look-up tables generated or maintained by a decoder for the bilateral filter, wherein the plurality of look-up tables comprise index values and associated approximated offset values for use in determining the bilateral filter offset value to be applied to the respective pixel, wherein different ones of the plurality of look-up tables are associated with different quantization parameters used in decoding the portion of the image of the video, and wherein:
         (i) a given quantization parameter is associated with the respective portion, and the selected look-up table is selected from those look-up tables of the plurality of look-up tables that are associated with the given quantization parameter based on the determined adaptive adjustment factor; or (ii) approximated offset values of the selected look-up table are modified based on the determined adaptive adjustment factor;

determining, for a neighboring pixel of the respective pixel, an index value into the selected look-up table;

retrieving, for the neighboring pixel, at least one approximated offset value for use in determining the bilateral filter offset value to be applied to the respective pixel, wherein the at least one approximated offset value is retrieved from the selected look-up table based on the determined index value;

determining the bilateral filter offset value to be applied to the respective pixel based at least in part on the retrieved at least one approximated offset value for the neighboring pixel; and applying the determined bilateral filter offset value to the pixel value for the respective pixel to determine a filtered pixel value data for the respective pixel.

2. The method of claim 1, wherein the index value is determined based on a location or a distance of the neighboring pixel relative to the respective pixel and based on a pixel value of the neighboring pixel.

3. The method of claim 1, further comprising:
determining a sum of the at least one approximated offset value;
determining an absolute value of the sum of the at least one approximated offset value;
applying a shift operator to the absolute value of the sum of the at least one approximated offset value based on a number of neighboring pixels being used to the determine the bilateral filter offset value; and
applying a positive sign or a negative sign to the absolute value of the sum of the at least one approximated offset value after applying the shift operator.

4. The method of claim 1, wherein the one or more characteristics of the portion of the image used to determine the adaptive adjustment factor comprise one or more of:
a bit-depth of pixels of the respective portion, wherein the decoder generates or maintains different look-up tables for different bit-depths;
a dynamic range associated with the respective portion, wherein the decoder generates or maintains different look-up tables for standard dynamic range and high-dynamic range;
color primaries, wherein the decoder generates or maintains different look-up tables for different color primaries;
transfer characteristics, wherein the decoder generates or maintains different look-up tables for different transfer characteristics;
matrix coefficients, wherein the decoder generates or maintains different look-up tables for different matrix coefficients; or
prediction mode type, wherein the decoder generates or maintains different look-up tables for an intra-prediction mode and an inter-prediction mode.

5. The method of claim 1, wherein the one or more characteristics of the respective portion used to determine the adaptive adjustment factor comprise one or more of:
a number of neighboring pixels used to determine the bilateral filter offset, wherein for a pixel on a boundary having fewer neighboring pixels than a pixel not on a boundary, the decoder is configured to utilize a different look-up table for the pixel having fewer neighboring pixels.

6. The method of claim 1, comprising:
receiving signaling information indicating a number of neighboring pixels to be used to determine the bilateral filter offset.

7. The method of claim 1, comprising:
receiving signaling information indicating an arrangement of neighboring pixels to be used to determine the bilateral filter offset.

8. The method of claim 1, wherein the adaptive adjustment factor comprises scaling information to scale the approximated offset values of the selected look-up table based on a location or distance of the neighboring pixel to the respective pixel.

9. The method of claim 1, wherein the neighboring pixel is a pixel of a previous or subsequent image frame relative to an image frame that includes the respective pixel.

10. The method of claim 1, wherein at least some of the look-up tables generated or maintained by the decoder are interpolated from other ones of the look-up tables, the method further comprising receiving signaling information including an instruction to generate the at least some interpolated look-up tables from the other ones of the look-up tables.

11. The method of claim 1, wherein at least some of the look-up tables generated or maintained by the decoder are generated by applying one or more delta values to other ones of the look-up tables, the method further comprising receiving signaling information including an instruction to generate the at least some look-up tables from the other ones of the look-up tables using the one or more delta values.

12. The method of claim 1, wherein the one or more characteristics of the respective portion used to determine the adaptive adjustment factor comprise a quantization parameter of a neighboring portion of the image.

13. The method of claim 1, wherein the decoder is configured to generate or maintain different look-up tables for luma values and chroma values.

14. The method of claim 1, wherein the approximated offset values of the look-up tables do not include negative values.

15. The method of claim 1, wherein the bilateral filter is included as a sub-component of a sample adaptive offset (SAO) filter.

16. The method of claim 1, wherein the bilateral filter is applied in a prediction process to determine predicted pixel values.

17. The method of claim 1, wherein the bilateral filter is applied to images stored in a decoded picture buffer.

18. A device, comprising:
at least one processor; and
memory storing instructions executable by the at least one processor to perform operations comprising:
determining an adaptive adjustment factor to be applied by a bilateral filter to pixel value data for an image of a video, wherein the adaptive adjustment factor is determined based on one or more characteristics of a portion of the image; and
for respective pixels of the portion of the image for which a bilateral filter offset value is to be determined:
selecting a look-up table from a plurality of look-up tables generated or maintained by a decoder for the bilateral filter, wherein the plurality of look-up tables comprise index values and associated approximated offset values for use in determining the bilateral filter offset value to be applied to the respective pixel, wherein different ones of the plurality of look-up tables are associated with different quantization parameters used in decoding the portion of the image of the video, and wherein:
  (i) a given quantization parameter is associated with the respective portion, and the selected look-up table is selected from those look-up tables of the plurality of look-up tables that are associated with the given quantization parameter based on the determined adaptive adjustment factor; or
  (ii) approximated offset values of the selected look-up table are modified based on the determined adaptive adjustment factor;
determining, for a neighboring pixel of the respective pixel, an index value into the selected look-up table;
retrieving, for the neighboring pixel, at least one approximated offset value for use in determining the bilateral filter offset value to be applied to the respective pixel, wherein the at least one approximated offset value is retrieved from the selected look-up table based on the determined index value;
determining the bilateral filter offset value to be applied to the respective pixel based at least in part on the retrieved at least one approximated offset value for the neighboring pixel; and
applying the determined bilateral filter offset value to the pixel value for the respective pixel to determine a filtered pixel value data for the respective pixel.

19. A method of encoding, comprising:
determining an adaptive adjustment factor to be applied by a bilateral filter to pixel value data for an image of a video, wherein the adaptive adjustment factor is determined based on one or more characteristics of a portion of the image; and
for respective pixels of the portion of the image for which a bilateral filter offset value is to be determined:
  selecting a look-up table from a plurality of look-up tables generated or maintained by an encoder for the bilateral filter, wherein the plurality of look-up tables comprise index values and associated approximated offset values for use in determining the bilateral filter offset value to be applied to the respective pixel, wherein different ones of the plurality of look-up tables are associated with different quantization parameters used in encoding the portion of the image of the video, and wherein:
    (i) a given quantization parameter is associated with the respective portion, and the selected look-up table is selected from those look-up tables of the plurality of look-up tables that are associated with the given quantization parameter based on the determined adaptive adjustment factor; or
    (ii) approximated offset values of the selected look-up table are modified based on the determined adaptive adjustment factor;
  determining, for a neighboring pixel of the respective pixel, an index value into the selected look-up table;
  retrieving, for the neighboring pixel, at least one approximated offset value for use in determining the bilateral filter offset value to be applied to the respective pixel, wherein the at least one approximated offset value is retrieved from the selected look-up table based on the determined index value;
  determining the bilateral filter offset value to be applied to the respective pixel based at least in part on the retrieved at least one approximated offset value for the neighboring pixel; and
  applying the determined bilateral filter offset value to the pixel value for the respective pixel to determine a filtered pixel value data for the respective pixel.

\* \* \* \* \*